United States Patent [19]

Coué

[11] Patent Number: 4,723,462

[45] Date of Patent: * Feb. 9, 1988

[54] ACTUATING LEVER IN PARTICULAR FOR A DERAILLEUR

[75] Inventor: Maurice Coué, Feucherolles, France

[73] Assignee: Huret et ses Fils, Nanterre, France

[*] Notice: The portion of the term of this patent subsequent to Jun. 9, 2004 has been disclaimed.

[21] Appl. No.: 901,996

[22] Filed: Aug. 28, 1986

Related U.S. Application Data

[63] Continuation of Ser. No. 517,061, Jul. 25, 1983, abandoned.

[30] Foreign Application Priority Data

Aug. 2, 1982 [FR] France ................. 82 13466

[51] Int. Cl.⁴ ............... F16C 1/10; G05G 5/06
[52] U.S. Cl. .................. 74/531; 74/501 R; 74/523
[58] Field of Search ............ 74/531, 501 R, 475, 74/502.2, 489, 523

[56] References Cited

U.S. PATENT DOCUMENTS

| | | | |
|---|---|---|---|
| 2,139,863 | 12/1938 | Snell | 74/531 |
| 2,559,960 | 7/1951 | Houplain | 192/8 R |
| 3,915,029 | 10/1975 | Shimada | 74/501 R |

FOREIGN PATENT DOCUMENTS

| | | | |
|---|---|---|---|
| 372229 | 3/1923 | Fed. Rep. of Germany | 74/548 |
| 369645 | of 0000 | France | 74/531 |
| 736218 | 11/1932 | France | 74/531 |
| 1121806 | 5/1956 | France | 74/489 |

Primary Examiner—Gary L. Smith
Assistant Examiner—Vinh Luong
Attorney, Agent, or Firm—Trexler, Bushnell, Giangiorgi & Blackstone, Ltd.

[57] ABSTRACT

An arrangement whereby the resisting force tending to oppose the shifting of a lever is roughly constant, irrespective of the direction in which the lever is shifted. For this purpose, the lever 1 is roughly freely rotatively mounted on its support 4 and an intermediate ring 7 is provided and frictionally mounted relative to the support, the lever 1 defining a cavity 18 which opens onto the outer surface of the ring 7 and in which is received an element 19 for achieving a coupling between the lever and the ring. The cavity defines a cam surface which is so oriented as to achieve a unidirectional coupling by a wedging of the coupling element between the lever and the ring.

2 Claims, 2 Drawing Figures

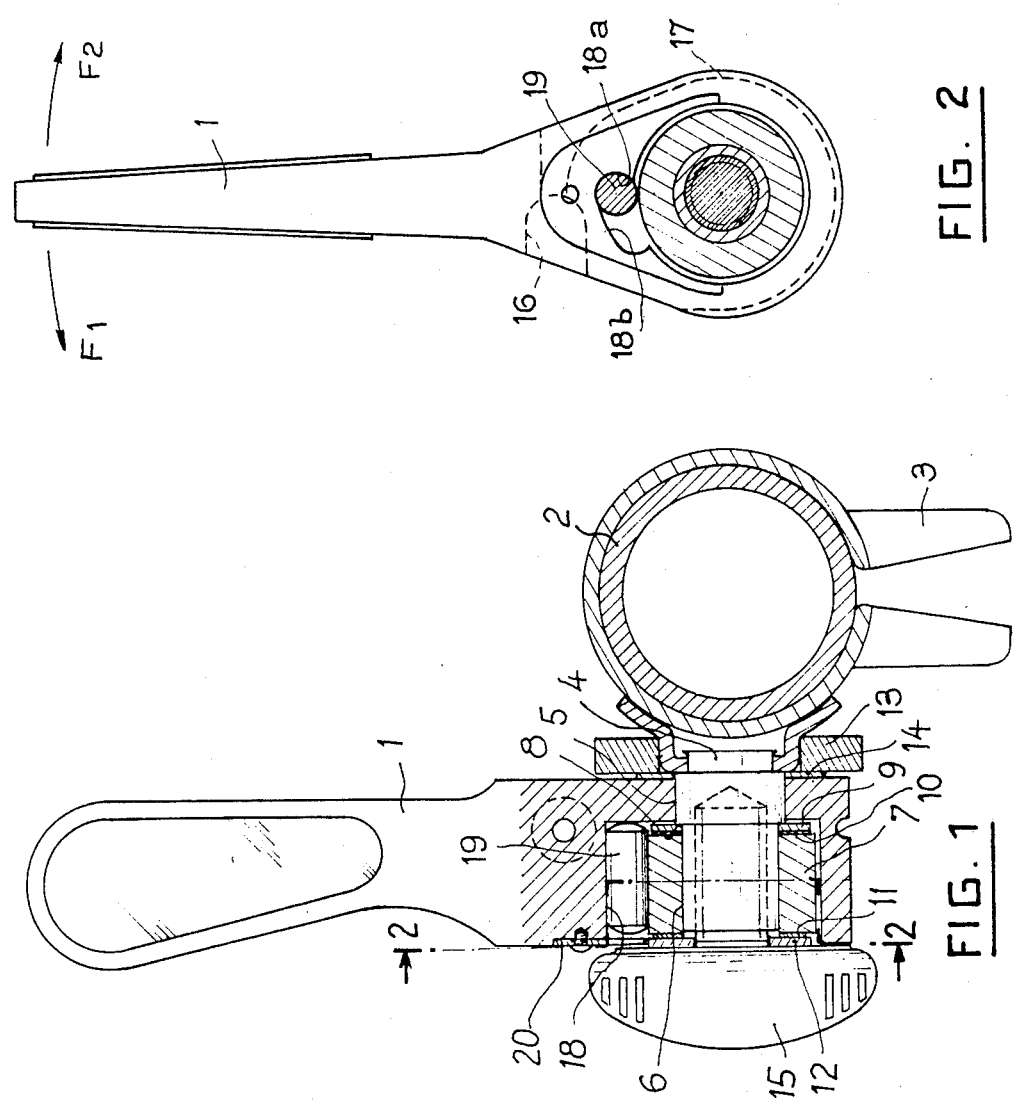

ACTUATING LEVER IN PARTICULAR FOR A DERAILLEUR

This application is a continuation of application Ser. No. 517,061, filed July 25, 1983 now abandoned.

The present invention relates to levers for actuating, for example, a cycle derailleur, its actuation occurring usually through a cable.

It is known generally that derailleurs for cycles are biased toward a position by a spring so that the resistance to the actuating effort is higher in one of the two directions of actuation of the lever. Indeed, in one direction, the user must overcome the force exerted by the return spring, while in the other direction, this return force tends to facilitate the actuation. It is also known to provide a friction device between the lever and its support so as to maintain the lever and the derailleur in the position selected by the user notwithstanding the return force exerted by the spring.

An object of the invention is to provide an arrangement whereby the resisting force tending to oppose the displacement of the lever is roughly constant whatever the direction in which this lever is shifted.

One arrangement would consist in interposing between the lever proper and the friction device a pawl mechanism. Such an arrangement has two major drawbacks, namely a relatively high cost since the lever and the adjacent elements must be fitted together in a rather precise manner and such a pawl mechanism is noisy.

Consequently, the invention provides a solution to the aforementioned problem which is simple, cheap, does not affect the overall size of the actuating device, and is silent.

The invention therefore provides an actuating device in particular for a cycle derailleur of the type comprising a lever rotatively mounted on a support, friction means being provided between the lever and its support, wherein the lever is roughly freely rotatively mounted on its support and an intermediate ring is provided which is frictionally mounted relative to the support, the lever defining a cavity which opens onto the surface of said ring and in which is received a coupling element for coupling the lever to the ring, said cavity defining a cam surface which is so oriented as to achieve a unidirectional coupling between the lever and the ring by a wedging of the coupling element therebetween.

According to another feature, the coupling element is a simple roller.

The invention will be described hereinafter with reference to the accompanying drawing which is given by way of example and in which:

FIG. 1 is a partial sectional view of an actuating device according to the invention;

FIG. 2 is a sectional view taken on line 2—2 of FIG. 1.

The drawing shows a lever 1 for actuating a cycle derailleur mounted on a frame element 2 or on a handlebar by means of a collar 3. Fixed on the latter, for example by welding, is a support stud 4 which defines a first cylindrical bearing surface 5 on which the lever 1 is roughly freely rotatively mounted, and a second cylindrical bearing surface 6 on which a sleeve or ring 7 is received. A radial shoulder 8 against which a first thrust washer 9 bears, is defined between the two surfaces 5 and 6.

A friction washer 10 is interposed between this thrust washer 9 and the lateral surface of the ring 7. A second friction washer 11 is interposed between the other lateral surface of the ring 7 and the second thrust washer 12 which comprises, for example, two flat surfaces and is keyed against rotation relative to the stud 4. This assembly is completed by a plate 13 which is carried by the support and against which the lateral surface of the lever may be guided, with interposition of an anti-friction washer 14, and by a screw 15 which tightens and fixes the component parts of the assembly together.

The lever 1 defines, in the known manner, a recess 16 in which is received the head of a cable (not shown), this cable being guided in a groove 17 formed in the peripheral edge of the lever.

The lever also defines a cavity 18 which opens onto the outer surface of the sleeve 7 and in which is received a cylindrical roller 19. The cavity 18 defines at one end a bearing surface 18a whose shape is roughly complementary to that of the roller, this bearing surface being extended by a cam surface 18b which is spaced from the outer surface of the sleeve a distance which gradually decreases in the direction away from the bearing surface 18a.

The cavity 18, which also opens onto the lateral side of the lever, may be closed by a plate 20.

This device operates in the following manner:

When the lever is shifted in the direction of arrow F1 in FIG. 2, a pull is exerted on the control cable. The roller 19 occupies the position shown in FIG. 2 and maintains this position when the lever is shifted. In this position, the roller provides no driving connection between the lever and the ring 7 and the angular displacement of the lever relative to its support is substantially free. On the other hand, the return spring for the derailleur exerts a resistant torque in response to the actuating effort on the part of the user.

On the other hand, if the lever is shifted in the direction of arrow F2 in FIG. 2, there is a tendency to release slacken the cable so that the return spring of the derailleur tends to facilitate the displacement of the lever. On the other hand, owing to the presence of the cam surface 18b, the roller becomes wedged between the lever and the ring 7. Consequently there is a resistant force due to the friction between the ring 7 and the support, and this resistant force is so chosen as to be roughly equivalent to that exerted before by the return spring of the derailleur.

Thus is can be seen that the problem presented has been solved very well: indeed, the means employed for obtaining this result are very simple since it is very easy to mould the lever in such manner as to form the cavity 18, and the roller 19 constitutes a very cheap component part. No additional drawback results from this adaptation. Moreover, the operation of this device is perfectly silent.

What is claimed is:

1. An actuating device for a cycle derailleur, which is actuatable in two opposed directions one of which is spring-biased and is a return direction, the actuating device comprising a support means, a lever for connection to said cycle derailleur for actuating it and substantially freely mounted on the support to be rotatable in a first direction about said support, and intermediate cylindrical ring rotatably disposed on said support and interposed between the lever and the support and having an outer surface and axially opposite end surfaces, friction means including washers interposed between said end surfaces of said cylindrical ring and said support, the lever defining a cavity which opens onto the outer surface of the cylindrical ring said washers being received entirely within the cavity, and a cylindrical roller coupling element received entirely within the cavity for achieving a wedging coupling between the lever and the ring, the entire cavity defining at one end a bearing surface for the cylindrical rollers, said bearing surface being extended by a cam surface which is so oriented as to achieve a unidirectional coupling between the lever and the ring by a wedging of the cylindrical roller coupling element between the cam surface of the cavity of the lever and the outer surface of the ring for rotating the ring with the lever in a second direction opposite to said first direction, said friction means and said unidirectional coupling being such as to create a resistant torque on said ring and on said lever through said unidirectional coupling for compensating for the effect of said spring-biasing of said cycle derailleur when said lever is rotated in said second direction opposed to said first direction about said support.

2. A device according to claim 1 wherein the cavity defines at one end of the cavity a bearing surface which has a shape complementary to the shape of the coupling element, the cam surface extending from said bearing surface.

* * * * *